US008370871B2

(12) United States Patent  
Cho

(10) Patent No.: US 8,370,871 B2  
(45) Date of Patent: Feb. 5, 2013

(54) IMAGE SIGNAL RECEIVER FOR DIAGNOSING AND EDITING CHANNEL, AND CONTROL METHOD THEREOF

(75) Inventor: Eun Hyung Cho, Gumi-si (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 11/828,396

(22) Filed: Jul. 26, 2007

(65) Prior Publication Data

US 2008/0028424 A1    Jan. 31, 2008

(30) Foreign Application Priority Data

Jul. 28, 2006   (KR) .................. 10-2006-0071213

(51) Int. Cl.
G06F 3/00       (2006.01)
G06F 13/00      (2006.01)
H04N 5/445      (2006.01)

(52) U.S. Cl. ............. 725/38; 725/72; 348/570; 348/732

(58) Field of Classification Search .................... 725/37, 725/44, 47, 38, 70, 72; 348/180, 193, 569, 348/570, 732
See application file for complete search history.

(56) References Cited

U.S. PATENT DOCUMENTS

| 6,181,921 | B1 |  | 1/2001 | Konisi et al. |
| 6,661,468 | B2 | * | 12/2003 | Alten et al. ................. 348/569 |
| 6,985,190 | B1 | * | 1/2006 | Klopfenstein et al. ........ 348/569 |
| 2004/0105031 | A1 |  | 6/2004 | Shibusawa |
| 2004/0183947 | A1 |  | 9/2004 | Lee |
| 2005/0289608 | A1 |  | 12/2005 | Takagi et al. |
| 2005/0289609 | A1 |  | 12/2005 | Takagi et al. |
| 2006/0005221 | A1 | * | 1/2006 | MacBeth et al. ................ 725/47 |
| 2006/0037046 | A1 | * | 2/2006 | Simms et al. ................... 725/56 |
| 2007/0293200 | A1 | * | 12/2007 | Roundtree et al. ......... 455/414.1 |

FOREIGN PATENT DOCUMENTS

| CN | 1652583 |  | 8/2005 |
| CN | 1691761 |  | 11/2005 |
| CN | 1750619 |  | 3/2006 |
| CN | 1809135 | A | 7/2006 |
| CN | 1921582 | A | 2/2007 |
| CN | 100562081 | C | 11/2009 |
| GB | 2384924 | A | 8/2003 |
| JP | 2001-285734 | A | 10/2001 |
| JP | 2002-335458 | A | 11/2002 |
| JP | 2003-219303 | A | 7/2003 |
| JP | 2004-228695 | A | 8/2004 |
| JP | 2005-269506 | A | 9/2005 |
| JP | 2006-128960 | A | 5/2006 |

OTHER PUBLICATIONS

European Search Report dated Mar. 2, 2011, 2011 for Application No. EP07252823.5, 5 pages.
Korean Notice of Allowance dated Jan. 21, 2008 for Application No. 10-2006-0071213, with English translation, 5 pages.

* cited by examiner

*Primary Examiner* — Ngoc Vu

(74) *Attorney, Agent, or Firm* — Fish & Richardson P.C.

(57) ABSTRACT

Provided are a system and a method for diagnosing and editing a channel using received signal sensitivity. The method allows a user to edit a channel on a received signal sensitivity diagnosis screen of a digital TV, so that the user can edit a favorite channel while checking received signal sensitivity of a predetermined channel. Since a user can edit a channel while checking received signal sensitivity of each channel, channel diagnosis and channel editing can be performed accurately and efficiently.

20 Claims, 7 Drawing Sheets

PRIOR ART

PRIOR ART

IMAGE SIGNAL RECEIVER FOR DIAGNOSING AND EDITING CHANNEL, AND CONTROL METHOD THEREOF

BACKGROUND OF THE INVENTION

1. Field of the Invention

The present invention relates to a system and a method for diagnosing and editing a channel using reception sensitivity, and more particularly, to a image signal receiver and a control method thereof, capable of diagnosing and editing a channel, wherein a user can edit a favored channel while he checks received signal sensitivity of the channel by allowing the user to edit a channel on a received signal sensitivity diagnosis screen of a digital television (TV).

2. Description of the Related Art

Recently, a TV technology develops among image display apparatus fields, and particularly, an interest about a digital TV that adopts a digital transmission method increases as a method for transmitting broadcasting signals develops among the TV technology.

Also, as development of digital broadcasting is accelerated, high image quality/high sound quality broadcasting having lots of advantages is provided through a satellite/ground wave/cable. The digital broadcasting has the advantages of providing service using a variety of additional information as well as high image quality and high sound quality compared to a related art analog TV.

The digital broadcasting uses MPEG-2 for video signals, and uses AC-3 for audio signals. This compressed data is delivered to a user using a transmission method of QPSK/VSB/QAM via related art satellite/ground wave/cable bands.

This compression technology makes providing a variety of services possible. In case of a ground wave, four or more SD-class channels and one HD-class channel can be provided per one channel. Also, the digital TV transmits addition data together with video/audio signals in order to provide various services. Accordingly, the digital TV can provide service such as broadcasting guide service regarding information about increasing channels using the additional data.

A digital TV standard prescribes a menu for diagnosing sensitivity of a received signal shall be provided. A received signal sensitivity diagnosis window is also called an engineering diagnostics, which means a screen displaying sensitivities of received signals of each channel in terms of numerical values.

FIG. 1 is a view illustrating a received signal sensitivity diagnosis screen according to a related art.

Referring to FIG. 1, the received signal sensitivity diagnosis screen includes a data display part 10 for displaying system data, a channel list display part 20 for displaying a list of channels that can be viewed by a user, and sensitivities of received signals of respective channels, and a key input guide part 30 for informing data regarding a key a user should input in order to perform a desired operation.

In detail, the data display part 10 displays basic data of the digital TV such as manufacturer data, product model/type, a product serial number, and a version of a software installed in a product.

In detail, the channel list display part 20 sequentially displays a list of valid channels that can be selected by a user. Also, each item of the list includes a channel number display section 22 for displaying a number of a channel, and a received signal sensitivity display section 23 for displaying reception sensitivity of a channel.

In more detail, referring to FIG. 1, the received signal sensitivity display section 23 is formed in a bar type, so that received signal sensitivity of a channel can be displayed in a bar type. Also, the received signal sensitivity of the channel can be displayed using a numerical value. The received signal sensitivity of the channel can be displayed using both a bar and a numerical value.

In detail, the key input guide part 30 for providing data regarding a key a user should input in order to perform a desired operation. The key input guide part 30 can display a channel selection button and a previous screen button.

The above-described construction enables a user to check received signal sensitivity of each channel.

Meanwhile, as the digital TV provides a plurality of channels, a channel editing screen is provided to allow a user to select and display only a favorite channel.

FIG. 2 is a view illustrating a channel editing screen according to a related art.

Referring to FIG. 2, the channel editing screen includes a channel display part 31, a favorite channel list display part 32, a signal source (e.g., a TV, a TV/wired, a DTV) display window 33, a channel number display window 34, and a key input guide part 35. Also, the channel editing screen displays a predetermined favorite channel icon 41 next to a channel number registered as a favorite channel in order to visually express the channel number registered as the favorite channel.

A method for editing a channel of a digital TV having the above-described construction will be described with reference to FIG. 2. First, whether a user has selected the channel editing screen is judged. When the user has selected the channel editing screen as a result of the judgment, a currently memorized channel number is displayed in the form of a channel map using a darker color than that of a channel number not memorized. Only a channel selected by the user is displayed on a predetermined region set in advance.

Next, whether key input is present on the channel map is judged. When the key input is present as a result of the judgment, a channel corresponding to a channel number selected by the user is tuned. Also, when the user selects a channel editing function with respect to the selected channel, the selected channel editing function is performed. When an editing end key is input, editing is ended.

Since current broadcasting provides sixty nine wireless channels, one hundred twenty five wired channels, and sixty nine DTV channels, the channel editing screen displays all of the channel numbers, informs existence of the channels using light and shadow of the corresponding channel numbers, and allows the user to more easily identify favorite channels by making a predetermined mark ♥ 41 in front of the corresponding favorite channel numbers when the user sets memorized channels to the favorite channels.

However, according to a related art digital TV, the received signal sensitivity diagnosis screen and the channel editing screen are separated. That is, only received signal sensitivity of each channel can be checked through the related art received signal sensitivity diagnosis screen. Also, a user edits a channel without checking received signal sensitivity of each channel.

Therefore, when manually editing a channel, a user has inconvenience of checking a screen whose sensitivity is weak on the received signal sensitivity diagnosis screen, and entering the channel editing screen to edit the channel.

Also, since channels of a predetermined signal sensitivity are all stored when a user automatically edits a channel, there is a problem that signal sensitivity of a channel the user desires to view is weak and missed, or channels the user does not desire to view are all stored.

SUMMARY OF THE INVENTION

Accordingly, the present invention is directed to a image signal receiver capable of diagnosing and editing a channel and a control method thereof that substantially obviate one or more problems due to limitations and disadvantages of the related art.

An object of the present invention is to provide a system and a method for diagnosing and editing a channel using reception sensitivity, capable of diagnosing and editing a channel accurately and efficiently by incorporating a received signal sensitivity diagnosis screen and a channel editing screen, and allowing a user to edit a channel while checking received signal sensitivity of each channel.

Another object of the present invention is to provide a system and a method for diagnosing and editing a channel using reception sensitivity, wherein reception sensitivity of each channel is easily checked, so that a user can easily check whether a TV is out of order, and thus the user can perform self-diagnosis, so that the user can easily check whether a product is out of order before after-service.

Further another object of the present invention is to provide a system and a method for diagnosing and editing a channel using reception sensitivity, capable of reducing management and maintenance costs of a product manufacturer and a seller by allowing whether the product is out of order to be easily checked.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an image receiver including: a key input unit for allowing a user to input a desired command; a reception sensitivity detecting unit for detecting sensitivity of a received broadcasting signal; a control unit for analyzing the reception sensitivity detected by the reception sensitivity detecting unit, displaying the reception selectivity of each channel, and storing editing results in a memory when the user inputs a favorite channel editing command through the key input unit; and an image processing unit for providing a received signal sensitivity diagnosis and channel editing screen in response to a control signal from the control unit.

In another aspect of the present invention, there is provided a method for diagnosing and editing a channel, the method including: displaying a received image; when a user selects a channel diagnosis and channel editing menu, displaying a received signal sensitivity diagnosis and channel editing screen; and when the user inputs a channel editing button, performing a favorite channel editing function.

According to the present invention, a user can edit a channel while checking a received signal sensitivity of each channel, so that a channel diagnosis and channel editing can be accurately and efficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The sprit of the preset invention is not limited to embodiments described below, and a person of ordinary skill in the art would easily propose other embodiments that comes within the spirit of the present invention by adding, modifying, and deleting elements, which will be also included in the present invention.

Figure 3:
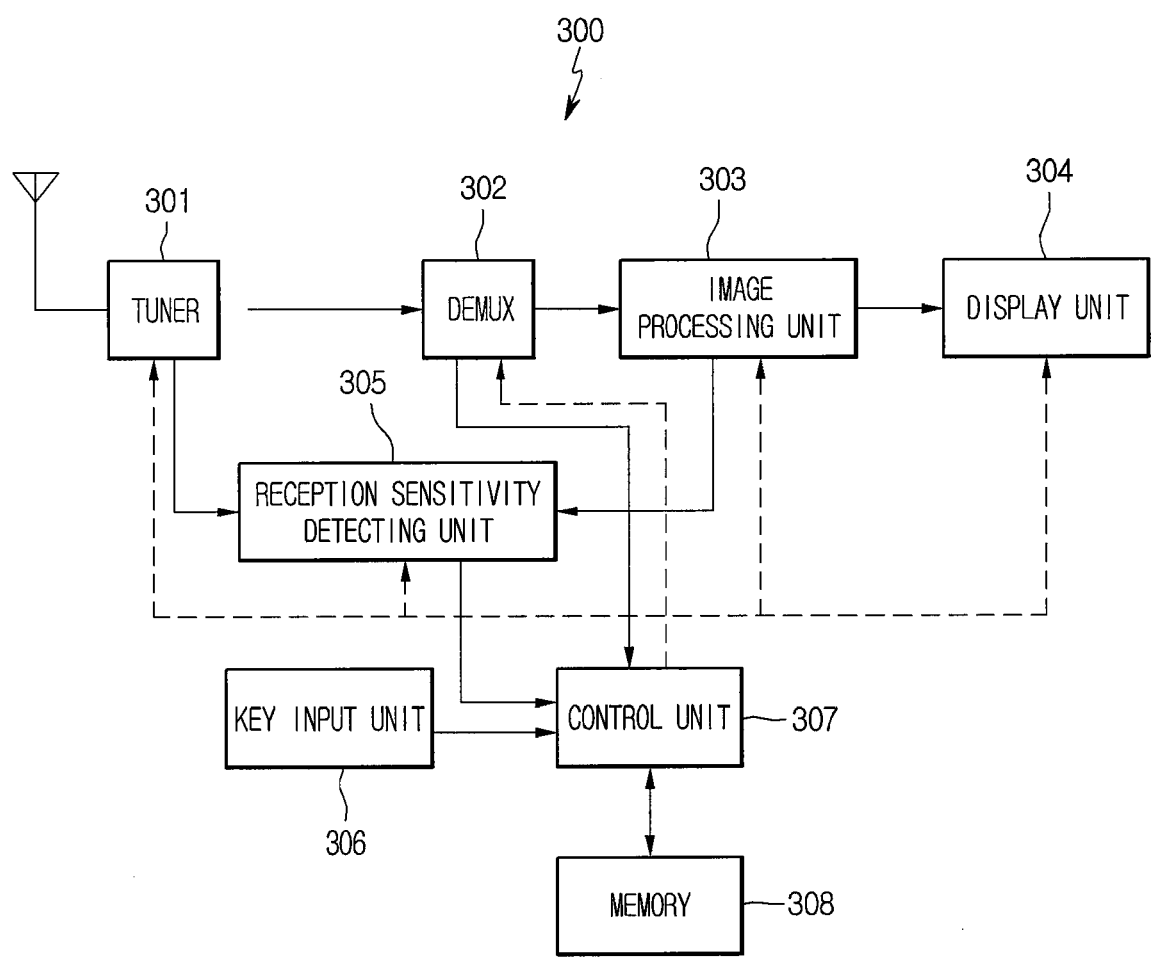
FIG. 3 is a block diagram of a system for diagnosing and editing a channel using received signal sensitivity according to the present invention.

FIG. 3 is a block diagram of a system for diagnosing and editing a channel using received signal sensitivity according to the present invention.

Referring to FIG. 3, the system 300 for diagnosing and editing a channel using received signal sensitivity includes: a key input unit 306 for allowing a user to input a desired command; a memory 308 for storing favorite channel data edited by a user; a tuner 301 for selecting broadcasting signals; a demultiplexer 302 for separating images, audios, and additional data from broadcasting signals received via the tuner 301; a reception sensitivity detecting unit 305 for detecting sensitivity of the broadcasting signals; a control unit 307 for analyzing reception sensitivity detected by the reception sensitivity detecting unit 305, controlling reception sensitivity of each channel to be displayed according to the analysis results, and controlling edited results to be stored in the memory 308 when the user inputs a favorite channel editing command via the key input unit 306; an image processing unit 303 for providing a received signal sensitivity diagnosis screen and a channel editing screen in response to a control signal from the control unit 307; and a display unit 304 for displaying an image processed by the image processing unit 303.

In detail, the reception sensitivity detecting unit 305 detects a received signal strength indicator of broadcasting signals selected by the tuner 301 to judge received signal sensitivity of each channel. Also, the reception sensitivity detecting unit 305 detects a signal-to-noise ratio (SNR) of image signals processed by the image processing unit 303 to judge received signal sensitivity of each channel. Also, the reception sensitivity detecting unit 305 can combine the received signal strength indicator and the SNR of the image signals to judge received signal sensitivity of each channel.

Figure 4:
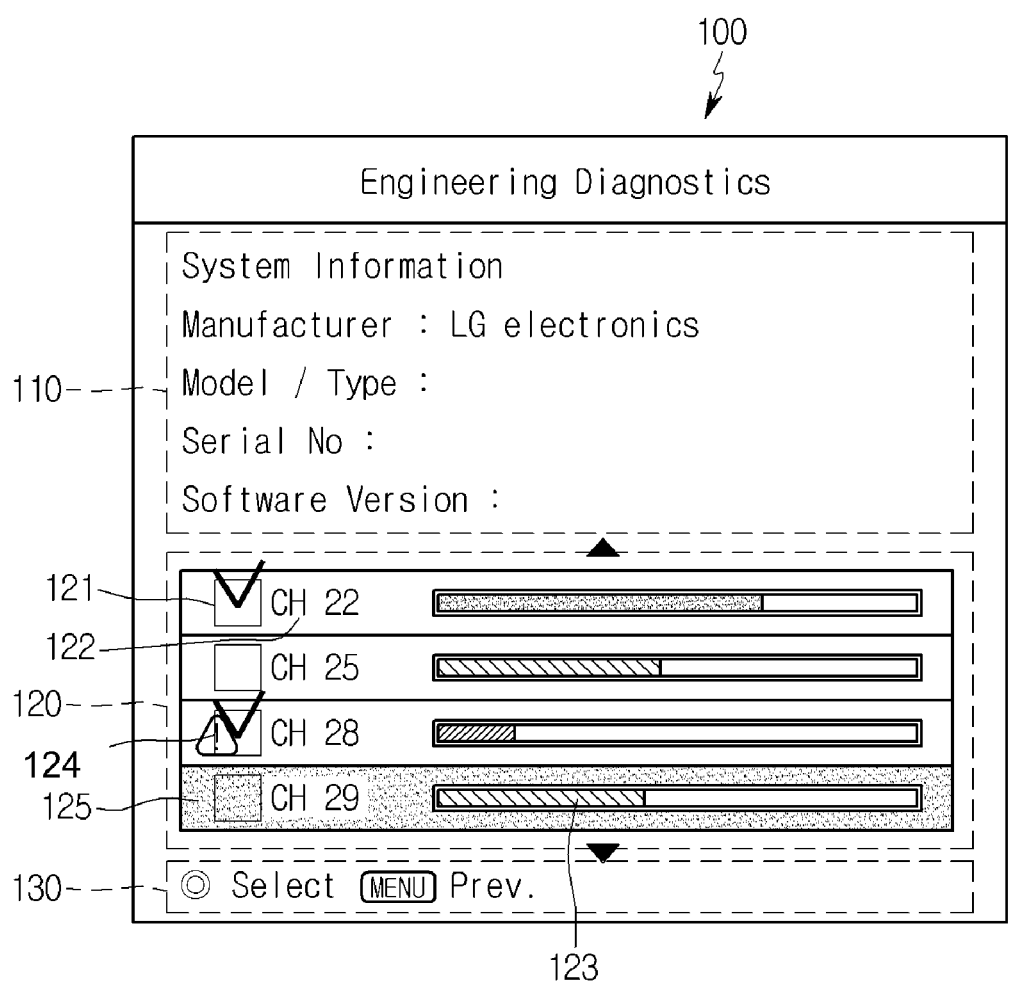
FIG. 4 is a view illustrating a received signal sensitivity diagnosis and channel editing screen according to the present invention.

FIG. 4 is a view illustrating a received signal sensitivity diagnosis and channel editing screen according to the present invention.

Referring to FIG. 4, the received signal sensitivity diagnosis and channel editing screen 100 includes: a data display part 110 for displaying system data; a channel list display part 120 for displaying a list of channels that can be viewed by a user, sensitivities of received signals of respective channels, and simultaneously an editing state of a corresponding channel; and a key input guide part 130 for informing data regarding a key the user should input in order to perform a desired operation.

In detail, the data display part 110 displays basic data of a digital TV such as manufacturer data, product model/type, a product serial number, and a version of a software installed in a product.

In detail, the channel list display part 120 sequentially displays a list of valid channels that can be selected by a user. Also, each item of the list includes a channel number display section 122 for displaying a number of a channel, a favorite channel display part 121 for displaying whether a channel is selected as a favorite channel by the user, and a received signal sensitivity display section 123 for displaying reception sensitivity of a channel.

In more detail, the favorite channel display part 121 can be formed in a check box type. A check mark can be displayed on a channel selected by a user as a favorite channel, and a blank check box can be displayed on a channel not selected.

Figure 1:
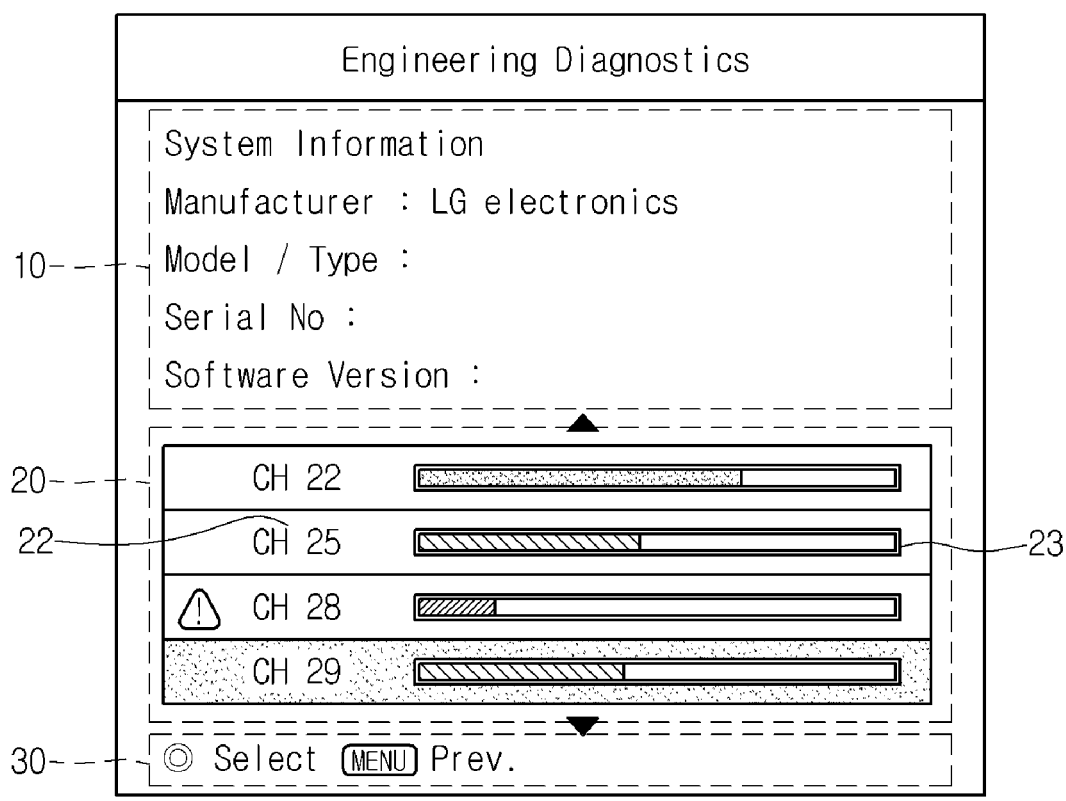
FIG. 1 is a view illustrating a received signal sensitivity diagnosis screen according to a related art.
Figure 2:
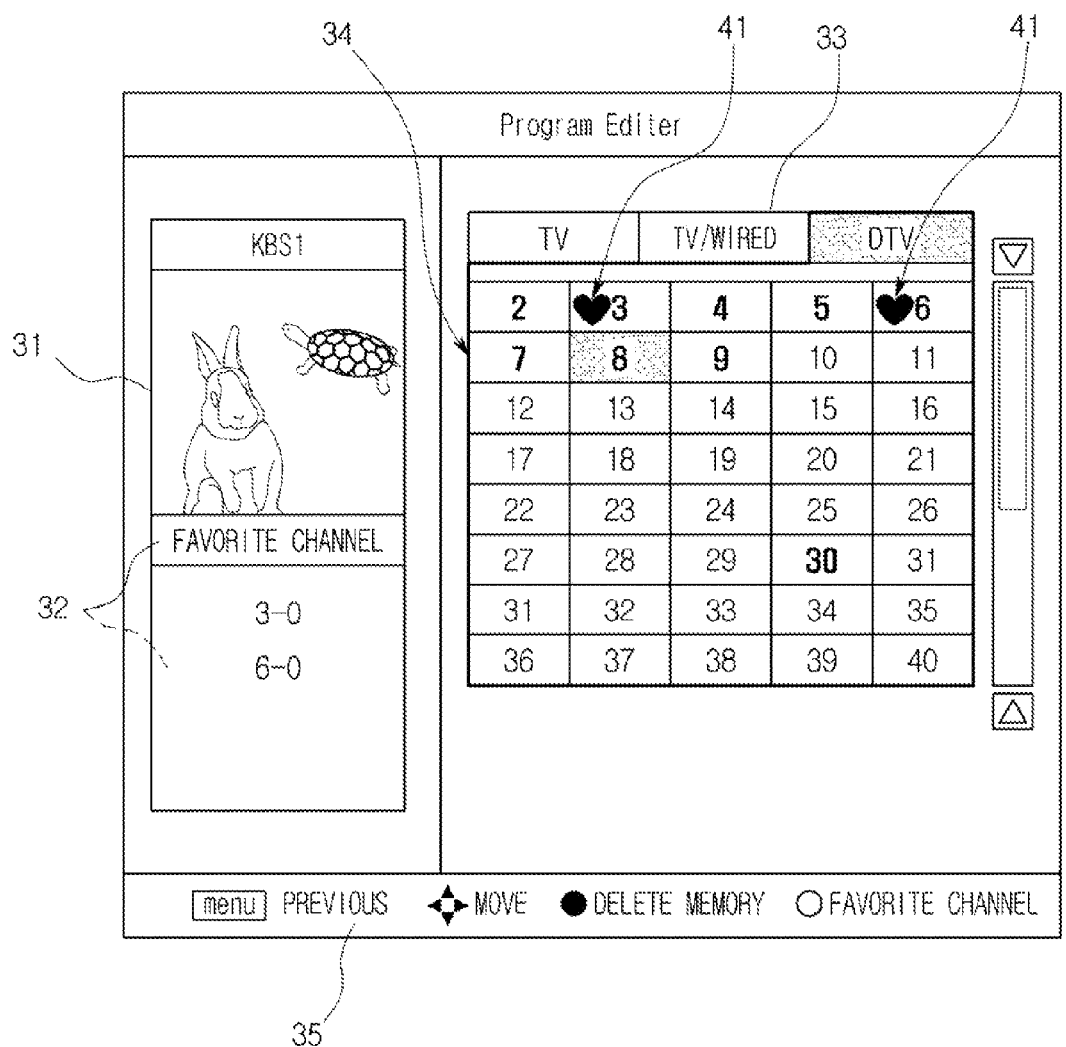
FIG. 2 is a view illustrating a channel editing screen according to a related art.

Also, though the favorite channel display part 121 is described in a check box type in the drawing, the spirit of the present invention is not limited thereto. Whether a channel is a favorite channel can be displayed using character data such as 'selection/non-selection', and can be displayed using an icon 41 of FIG. 2.

The favorite channel display part 121 can reflect a channel editing state by a user in real time. In other words, a favorite channel can be added or deleted on the channel diagnosis and editing screen in a method for diagnosing and editing a channel using received signal sensitivity according to the present invention. At this point, since a favorite channel added or deleted by the user is reflected on the channel diagnosis and editing screen in real time to allow the user to check editing results in real time, channel diagnosis and editing can be performed more efficiently and easily.

Meanwhile, the received signal sensitivity display section 123 is a part for displaying received signal sensitivity of each channel. The received signal sensitivity display section 123 is realized in a bar type to display received signal sensitivity of a channel using a bar's length. However, the spirit of the present invention is not limited thereto, but the received signal sensitivity can be displayed using a numerical value, or both the bar and a numerical value. Also, the received signal sensitivity can be expressed using a bar's color. For example, assuming that received signal sensitivity has a value between 0 and 100, the received signal sensitivity can be displayed in red color (corresponding to weak signals) for a value of 0-30, blue color (corresponding to normal signals) for a value of 30-70, and yellow (corresponding to strong signals) for a value of 70-100, so that the user can recognize received signal sensitivity of a corresponding channel by only checking the color of the bar.

The received signal sensitivity diagnosis and channel editing screen 100 can further include a signal sensitivity alarming part 124. That is, when received signal sensitivity of a channel is less than a predetermined level, the signal sensitivity alarming part 124 for displaying a danger icon on one side of the channel list display part 120 is further provided to allow the user to clearly recognize that received signals of the channel are less than a predetermined level.

Meanwhile, the same contents can be broadcasted through a plurality of channels in a digital TV. In this case, though not shown, another channel number providing better received signal sensitivity can be displayed on one side of the received signal sensitivity display section 123 while the same contents are broadcasted in the case where current received signal sensitivity is less than a predetermined level. With this construction, a user can selects a channel providing best received signal sensitivity from a plurality of channels through which the same contents are broadcasted, and view the contents.

Meanwhile, a channel 125 on which a cursor is currently located can be focused and discriminated from other channels on the channel list display part 120. Also, when a channel selection button 431 (of FIG. 6) is input by a user, a detail data display screen of the focused channel can be displayed. The detail data display screen of the channel will be described in detail with reference to FIG. 5.

Meanwhile, the key input guide part 130 is a part for guiding key data a user should input in order to perform a desired operation. The key input guide part 130 can include a channel selection button, a previous screen button, a direction moving button, and a channel editing button. Data displayed on the key input guide part 1300, and function of respective buttons will be described below with referenced to FIG. 6.

Figure 5:
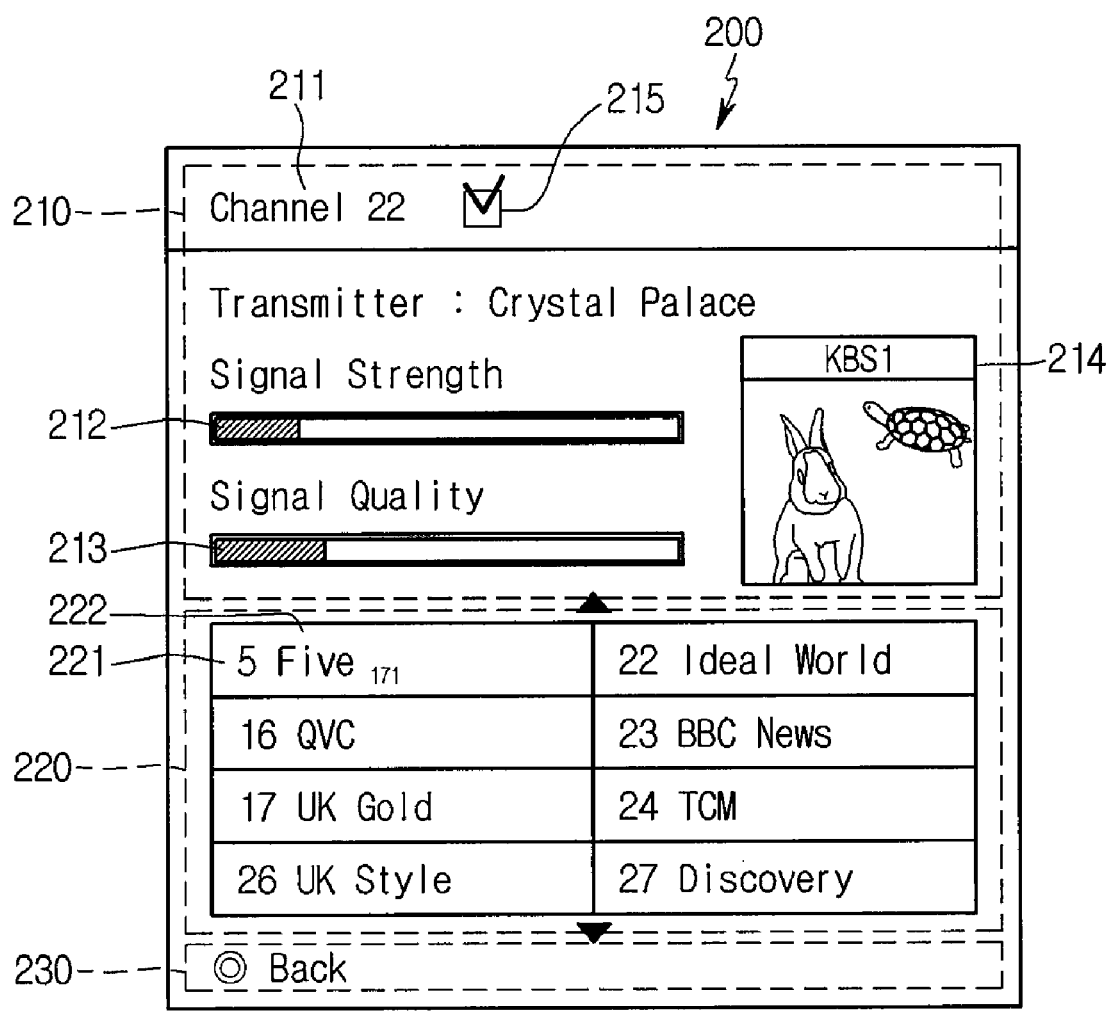
FIG. 5 is a view illustrating a channel detail data display screen according to the present invention.

FIG. 5 is a view illustrating a channel detail data display screen according to the present invention.

Referring to FIG. 5, the channel detail data display screen 200 includes a channel data display part 210 for displaying detail data of a channel, a channel list display part 220 for displaying a list of valid channels, and a key input guide part 230 for informing data regarding a key a user should input in order to perform a desired operation.

In detail, the channel data display part 210 for displaying detail data of a channel includes a channel number display part 211 for displaying a number of a currently selected channel, a signal strength display part 212 for displaying electrical strength of signals of the channel, a signal quality display part 213 for displaying an amount of noises contained in signals of the channel, and a current channel display part 214 for displaying a picture in picture (PIP) screen or a thumbnail image of a currently selected channel in order to allow a user to select a favorite channel.

The channel data display part 210 can further include a favorite channel display part 215 for displaying whether a channel is selected as a favorite channel by a user. Therefore, a favorite channel can be added or deleted on the channel detail data display screen 200 in the same way as in the channel diagnosis and editing screen.

Meanwhile, the current channel display part 214 displays data regarding contents broadcasted through a currently selected channel. Data displayed on the current channel display part 214 can be displayed by displaying content of current broadcasting of a corresponding channel in the form of a PIP, i.e., a sub-screen. Also, content of current broadcasting of a corresponding channel can be provided in the form of a thumbnail image or a text. Since a user can easily understand contents of a channel using data of the channel provided by the current channel display part 214, the user can more easily edit a desired channel the user desires to view.

Meanwhile, the channel list display part 220 is a part for displaying a list of channels that can be selected by a user.

When a channel on the list is selected by the user, a channel displayed on the channel detail data display screen 200 can be switched.

With the above-described construction, detail data of a channel selected by a user are displayed, and simultaneously, a favorite channel of the user can be edited, so that easiness of a user operation improves.

Figure 6:
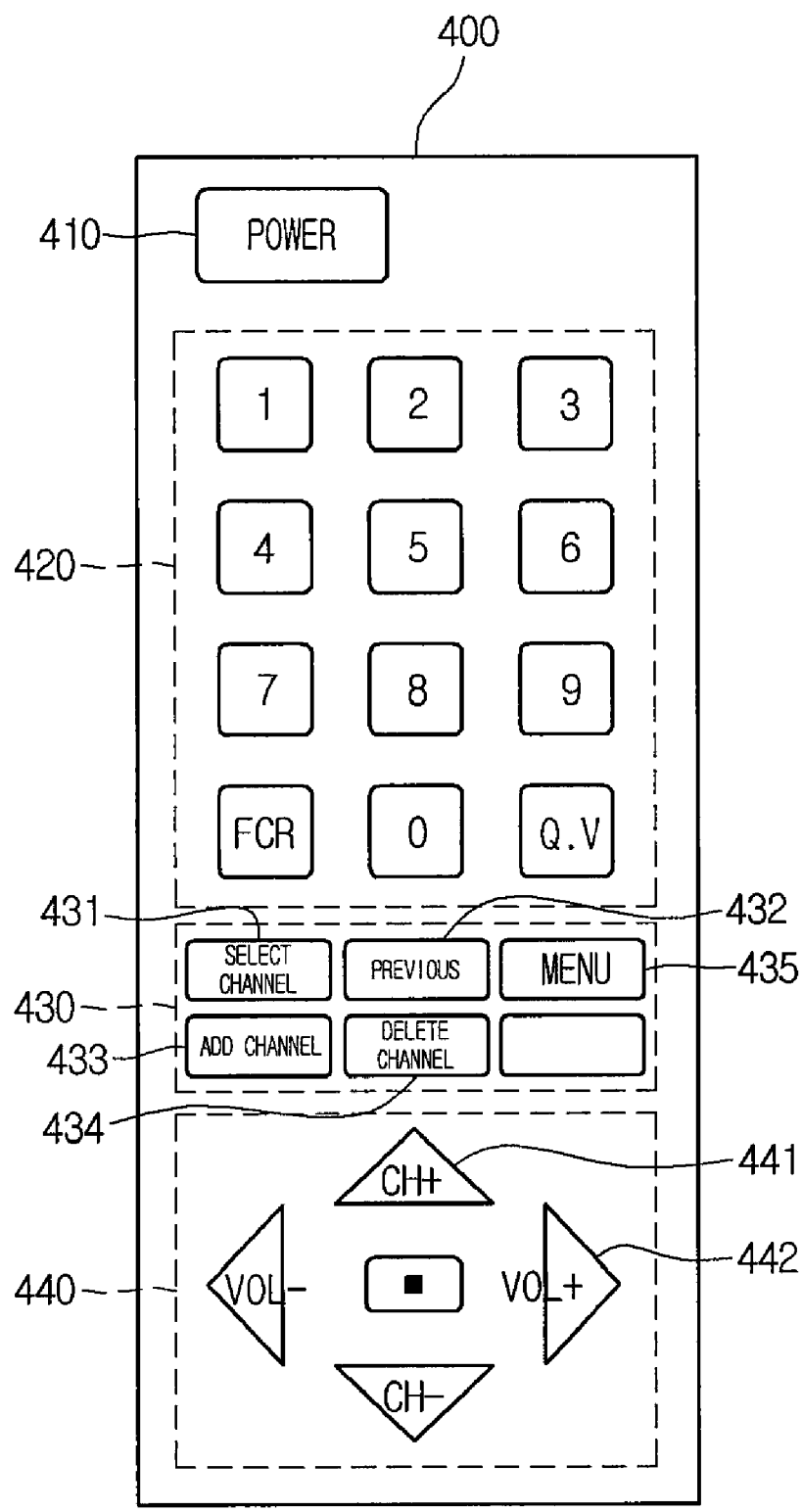
FIG. 6 is a view illustrating a remote controller for controlling a system for diagnosing and editing a channel using received signal sensitivity according to the present invention.

FIG. 6 is a view illustrating a remote controller for controlling a system for diagnosing and editing a channel using received signal sensitivity according to the present invention.

Referring to FIG. 6, the remote controller 400 includes a power control button 410 for controlling power of the system for diagnosing and editing a channel using received signal sensitivity, a number input part 420 for inputting numbers required for channel manipulation, a function control part 430 having a variety of buttons for performing various control functions such as channel editing, channel selecting, and moving to a previous screen, and a direction control part 440 for controlling a volume, moving a channel, or controlling a direction.

In detail, the function control part 430 includes a channel selection button 431 for displaying the channel detail data display screen 200 that is being focused within the channel list display parts 120 and 220, a previous button 432 for moving to a previous screen, a channel adding button 433 for adding a channel as a favorite channel of a user, and a channel deletion button 434 for deleting a channel from favorite channels of a user. Depending on embodiments, the channel adding button 433 and the channel deletion button 434 can be incorporated into a single channel adding and deleting button. In this case, when the button is input during a channel selected as a favorite channel, the selected favorite channel is deleted. When the button is input during a channel that is not a favorite channel, the channel is selected as a favorite channel.

An operation of the present invention will be described in more detail with reference to the above-described structure.

First, a user who intends to diagnose and edit a channel using received signal sensitivity inputs a menu button 435 (of FIG. 6) to enter a channel diagnosis and editing mode.

When the user enters the channel diagnosis and editing mode, the received signal sensitivity diagnosis and channel editing screen 100 is displayed as illustrated in FIG. 4. The data display part 110 located at an upper portion of the received signal sensitivity diagnosis and channel editing screen 100 displays system data of a digital TV. Also, a channel list display part 120 located at an intermediate portion of the received signal sensitivity diagnosis and channel editing screen 100 displays a list of channels that can be viewed by a user, received signal sensitivity of each channel, and whether each channel is stored as a favorite channel. Also, a key input guide part 130 located at a lower portion of the received signal sensitivity diagnosis and channel editing screen 100 displays data regarding a key the user should input in order to perform a desired operation.

When the user inputs one of up/down movement buttons 441 on the received signal sensitivity diagnosis and channel editing screen 100, a channel 125 focused on the channel list display part 120 changes. Also, when a user inputs the channel selection button 431, the channel detail data display screen 200 of a channel that is currently being focused is displayed. The channel detail data display screen 200 can be displayed in a pop-up form.

Also, the channel detail data display screen 200 displays detail data of a channel such as strength of received signals, signal quality, and a PIP screen of the channel. Also, as described above, a channel can be added/deleted also on the channel detail data display screen 200.

Meanwhile, when the user inputs the channel adding button 433 on the received signal sensitivity diagnosis and channel editing screen 100, a channel currently being focused is added to favorite channels of the user and stored in a memory, and simultaneously, a check mark is displayed on the favorite channel display part 121. Also, when the user inputs the channel deletion button 434, a channel currently being focused is excluded from the favorite channels of the user and deleted from the memory, and simultaneously, a check mark is cancelled on the favorite channel display part 121. Also, naturally, results where the channel is edited are reflected on a channel editing screen (refer to FIG. 2).

With the above construction, when poor quality is generated to a digital TV, a user can simply diagnose received signal sensitivity of the digital TV by himself before requesting after-service. Therefore, the user can save a trouble of requesting after-service to call a technician, and simultaneously, a seller can check a disorder of a product before after-service, so that maintenance costs of a product reduce.

Figure 7:
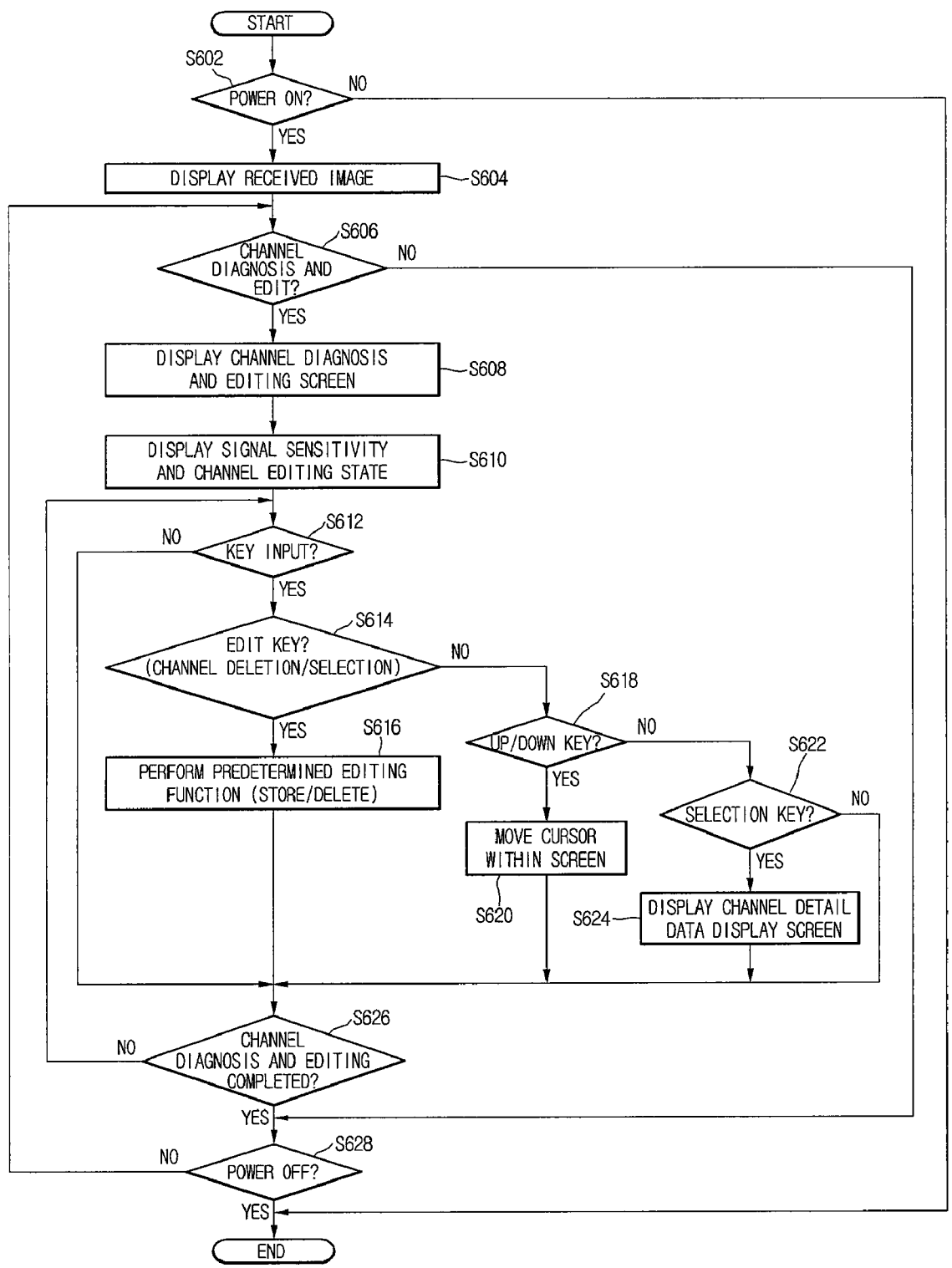
FIG. 7 is a flowchart of a method for diagnosing and editing a channel using received signal sensitivity according to the present invention.

FIG. 7 is a flowchart of a method for diagnosing and editing a channel using received signal sensitivity according to the present invention. The method for diagnosing and editing a channel will be described with reference to FIG. 7.

First, when a user inputs a power-on command, a received image is displayed (S602-S604).

Also, when a user selects a channel diagnosis and editing mode, the received signal sensitivity diagnosis and channel editing screen 100 is displayed to provide received signal sensitivity of each channel, and data regarding whether each channel has been selected as a favorite channel (S606-S610).

In other words, the received signal sensitivity diagnosis and channel editing screen 100 displays a list of valid channels, received signal sensitivities of respective channels, and editing states of the respective channels by a user, that is, whether the channel has been stored as a favorite channel.

Also, when the user inputs a key using the remote controller (S612) and the input key is a channel editing button such as the channel adding button 433 and the channel deletion button 434, the channel editing function input by the user is performed. Here, in the case where the input key is the channel adding button 433, the corresponding broadcasting channel is registered as a favorite channel. On the other hand, in the case where the input key is the channel deletion button 434, the corresponding channel is deleted (S614-S616).

Also, when the channel editing function is performed, results thereof can be displayed on a screen in real time. That is, when a channel is registered as a favorite channel, a check mark is generated on the favorite channel display part 121. When a channel is deleted from the favorite channels, the check mark on the favorite channel display part 121 is deleted.

Meanwhile, when the input key is one of the up/down buttons 441, a cursor on the channel list moves up and down, and focusing changes to a channel on which the cursor is located (S618-S620).

Meanwhile, when the input key is a channel selection button 431, the channel detail data display screen 200 (of FIG. 5) is displayed (S620-S624).

Last, when an edit end key (or a previous key) is input, channel diagnosis and channel editing is ended (S626).

With the above-described construction, received signal sensitivity can be diagnosed and a channel can be edited in real time, so that easiness in operation of a user improves and maintenance costs of a product by a manufacturing company reduce.

In the system and method for diagnosing and editing a channel using received signal sensitivity according to the present invention, a received signal sensitivity diagnosis screen and a channel editing screen are incorporated to allow a user to edit a channel while checking received signal sensitivity of each channel, so that channel diagnosis and channel editing can be performed accurately and efficiently.

Since reception sensitivity of each channel is easily checked, a user can easily check whether a TV is out of order, and thus the user can perform self-diagnosis, so that the user can easily check whether a product is out of order before after-service.

Since whether the product is out of order is easily checked, management and maintenance costs of a product manufacturer and a seller reduce.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An image receiver comprising:
  a key input unit for allowing a user to input a desired command;
  a reception sensitivity detecting unit for detecting sensitivity of a received broadcasting signal;
  a control unit for displaying the reception sensitivity of channels detected by the reception sensitivity detecting unit and storing editing results in a memory when the user inputs a channel editing command through the key input unit; and
  an image processing unit for providing a received signal sensitivity diagnosis and channel editing screen in response to a control signal from the control unit, the received signal sensitivity diagnosis and channel editing screen comprising a list of valid channels available for selection by the user,
  wherein each item of the list of valid channels available for selection by the user comprises:
    a channel identification section that displays an identifier for the corresponding channel in the list,
    a received signal sensitivity display section that displays reception sensitivity of the corresponding channel in the list based on output from the reception sensitivity detecting unit, and
    a favorite channel display part that displays whether the corresponding channel in the list is selected as a favorite channel by the user and that reflects a favorite channel editing state in real time based on favorite channel addition and deletion commands entered while the received signal sensitivity diagnosis and channel editing screen is being displayed, and
  wherein the received signal sensitivity display part further displays another channel number through which the same contents as those of a current channel are broadcasted and providing better received signal sensitivity than that of the current channel.

2. The image receiver according to claim 1, further comprising a display unit for displaying an image processed by the image processing unit.

3. The image receiver according to claim 1, wherein the reception sensitivity detecting unit detects a received signal strength indicator of broadcasting signals of a channel selected by a tuner.

4. The image receiver according to claim 1, wherein the reception sensitivity detecting unit detects a signal-to-noise ratio of image signals processed by the image processing unit.

5. The image receiver according to claim 1, wherein the favorite channel display part comprises one of a check box, a character, and an icon.

6. The image receiver according to claim 1, wherein the received signal sensitivity display part displays received signal sensitivity using one of a bar's length, a bar's color, and a numeral value.

7. The image receiver according to claim 1, wherein the received signal sensitivity diagnosis and channel editing screen comprises a signal sensitivity alarming part for allowing the user to clearly recognize signal sensitivity when the signal sensitivity of a channel is less than a predetermined level.

8. The image receiver according to claim 1, wherein, when the user selects a channel on the received signal sensitivity diagnosis and channel editing screen, a channel detail data display screen regarding the selected channel is provided.

9. The image receiver according to claim 8, wherein the channel detail data display screen comprises a signal strength display part and a signal quality display part.

10. The image receiver according to claim 8, wherein the channel detail data display screen provides contents of the each channel in the form of one of a picture in picture screen, a thumbnail image, and character data.

11. The image receiver according to claim 1, wherein the list of valid channels available for selection by the user comprises a first set of favorite channels selected by the user as favorites and a second set of channels not selected by the user as favorites such that less than all of the valid channels available for selection by the user are reflected as favorites.

12. The image receiver according to claim 1, wherein the favorite channel display part comprises an input control that enables the user to add or delete the corresponding channel in the list as a favorite channel.

13. The image receiver according to claim 1, wherein, when the user selects a channel on the received signal sensitivity diagnosis and channel editing screen, a channel detail data display screen regarding the selected channel is provided, the channel detail data display comprising an identifier for the selected channel, an indication of a signal strength for only the selected channel, an indication of a signal quality for only the selected channel, a favorite channel display part that displays whether the selected channel is a favorite channel of the user and enables the user to add or delete the selected channel as a favorite channel, and a channel list display part that displays a list of channels other than the selected channel and that enables the user to select another channel for which to display a channel detail data display screen.

14. The image receiver according to claim 1, wherein the received signal sensitivity display part further displays another channel number through which the same contents as those of the current channel are broadcasted and providing better received signal sensitivity than that of the current channel by displaying another digital channel number through which the same contents as those of a current digital channel are broadcasted and providing better received signal sensitivity than that of the current digital channel.

15. The image receiver according to claim 1, wherein the received signal sensitivity display part displays the other channel number through which the same contents as those of the current channel are broadcasted and providing better received signal sensitivity than that of the current channel when the reception sensitivity detecting unit detects sensitivity of a received signal of the other channel number that is better than sensitivity detected for a received signal of the current channel number.

16. A method for diagnosing and editing a channel, the method comprising:

displaying a received image;

when a user selects a channel diagnosis and channel editing menu, displaying, by an image processing unit, a received signal sensitivity diagnosis and channel editing screen unit, the received signal sensitivity diagnosis and channel editing screen comprising a list of valid channels available for selection by the user, wherein each item of the list of valid channels available for selection by the user comprises:

a channel identification section that displays an identifier for the corresponding channel in the list, a received signal sensitivity display section that displays reception sensitivity of the corresponding channel in the list based on output from a reception sensitivity detecting unit, and a favorite channel display part that displays whether the corresponding channel in the list is selected as a favorite channel by the user and that reflects a favorite channel editing state in real time based on favorite channel addition and deletion commands entered while the received signal sensitivity diagnosis and channel editing screen is being displayed; and when the user inputs a channel editing button while the received signal sensitivity diagnosis and channel editing screen is being displayed, performing a favorite channel editing function and updating, in real time, at least one favorite channel display part in the received signal sensitivity diagnosis and channel editing screen based on the favorite channel editing function, wherein the received signal sensitivity display part further displays another channel number through which the same contents as those of a current channel are broadcasted and providing better received signal sensitivity than that of the current channel.

17. The method according to claim 16, wherein the channel editing button comprises a channel adding button and a channel deletion button.

18. The method according to claim 16, wherein the performing of the favorite channel editing function comprises displaying favorite channel editing results on the received signal sensitivity diagnosis and channel editing screen in real time.

19. The method according to claim 16, wherein the performing of the favorite channel editing function comprises, when the user inputs a direction button, vertically moving a cursor on a list of channels, and changing focusing to a channel on which the cursor is located.

20. The method according to claim 16, wherein the performing of the favorite channel editing function comprises, when the user inputs a channel selection button, displaying a channel detail data display screen of a predetermined channel.

* * * * *

UNITED STATES PATENT AND TRADEMARK OFFICE
CERTIFICATE OF CORRECTION

| | |
|---|---|
| PATENT NO. | : 8,370,871 B2 |
| APPLICATION NO. | : 11/828396 |
| DATED | : February 5, 2013 |
| INVENTOR(S) | : Cho et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this
Eleventh Day of November, 2014

Michelle K. Lee
*Deputy Director of the United States Patent and Trademark Office*